US007649642B2

(12) United States Patent
Bos et al.

(10) Patent No.: US 7,649,642 B2
(45) Date of Patent: Jan. 19, 2010

(54) CUSTOMIZABLE PRINT MEDIA DEFINITION

(75) Inventors: Maria J. Bos, Eindhoven (NL);
Johannes J. M. Goossens, Asten (NL);
Frederik De Jong, Swalmen (NL)

(73) Assignee: OCE Technologies B.V., Venlo (NL)

( * ) Notice: Subject to any disclaimer, the term of this patent is extended or adjusted under 35 U.S.C. 154(b) by 872 days.

(21) Appl. No.: 11/179,995

(22) Filed: Jul. 13, 2005

(65) Prior Publication Data

US 2006/0012807 A1   Jan. 19, 2006

(30) Foreign Application Priority Data

Jul. 14, 2004   (EP)   ................... 04077038

(51) Int. Cl.
*G06F 3/12* (2006.01)
*G06K 15/00* (2006.01)
*G06F 3/00* (2006.01)

(52) U.S. Cl. .................. 358/1.15; 358/1.12; 715/700; 715/866

(58) Field of Classification Search ............... 358/1.12, 358/1.15; 715/700, 866
See application file for complete search history.

(56) References Cited

U.S. PATENT DOCUMENTS

| 5,130,806 | A | 7/1992 | Reed et al. | |
| 6,654,137 | B1 | 11/2003 | Yagita et al. | |
| 6,761,493 | B1* | 7/2004 | Hooper et al. | ............. 400/61 |
| 6,781,709 | B2* | 8/2004 | Nozawa | ............ 358/1.12 |
| 7,167,255 | B1* | 1/2007 | Mikami et al. | ............ 358/1.15 |
| 7,453,588 | B2* | 11/2008 | Kanazawa et al. | ......... 358/1.12 |
| 2003/0117639 | A1 | 6/2003 | Milton et al. | |
| 2003/0202010 | A1 | 10/2003 | Kerby et al. | |

FOREIGN PATENT DOCUMENTS

| EP | 0478340 A2 | 4/1992 |
| EP | 1 087 288 A1 | 3/2001 |
| EP | 1 557 749 A1 | 7/2005 |
| GB | 2 372 127 A | 8/2002 |

OTHER PUBLICATIONS

Heidelberg Digimaster 9110, Paper Catalog Utility User's Guide, Release 4, Jan. 2001.

* cited by examiner

*Primary Examiner*—Twyler L Haskins
*Assistant Examiner*—Fred Guillermety
(74) *Attorney, Agent, or Firm*—Birch, Stewart, Kolasch & Birch, LLP

(57) ABSTRACT

A method and system for printing documents on a network printer, are provided. The method includes defining a print job at a user's source station for printing in the printer. The print job includes print data and print process parameters. The print process parameters include a specification of a print media for printing images according to the print data, each media having print media properties. The defining step includes a generic print media specifying process, in which a print media for printing images according to the print data is selected by the user within constraints of a general set of media available for any user of the printer. The defining step also includes an alternative, specific, print media specifying process, in which a job-proprietary print media not included in the general set is specified by entering a free-form definition character string, as an identifying property of the job-proprietary media.

18 Claims, 6 Drawing Sheets

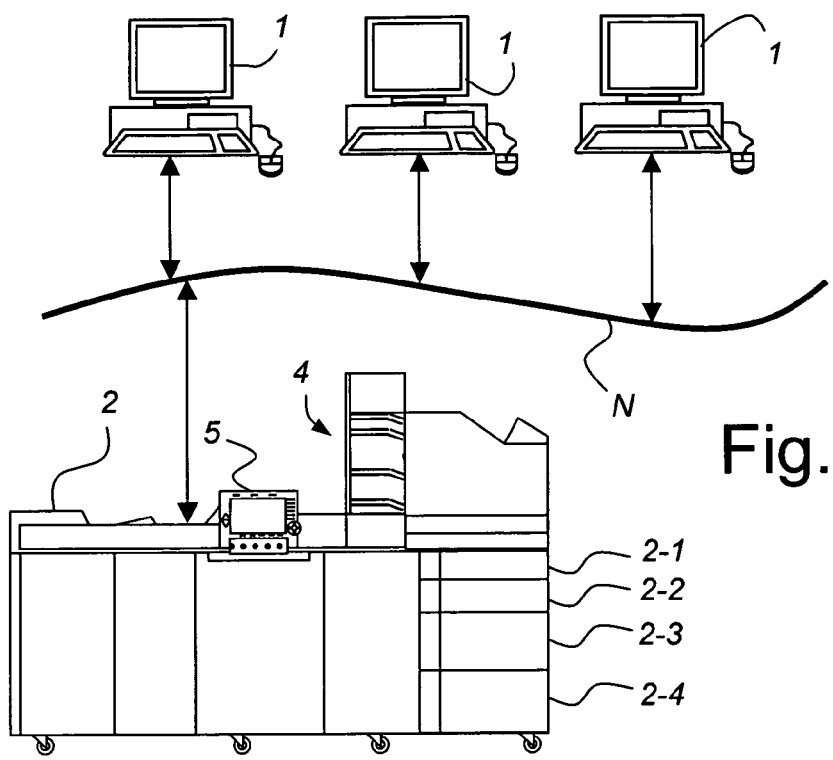
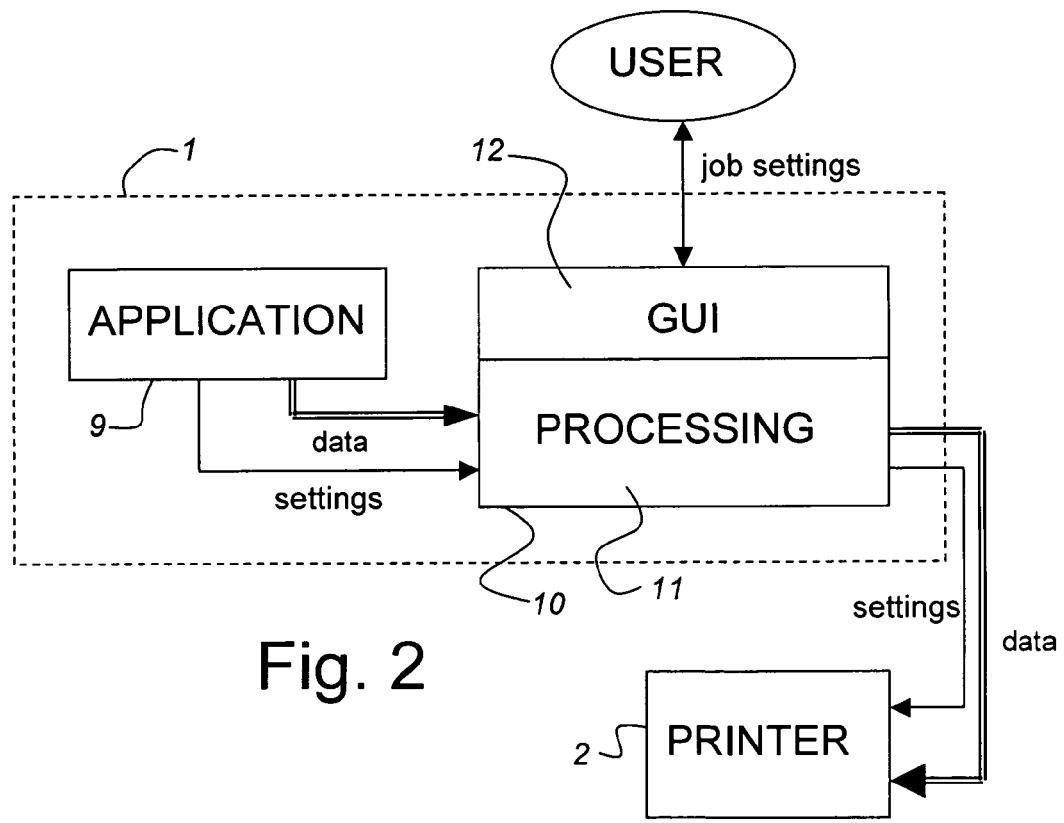

US 7,649,642 B2

CUSTOMIZABLE PRINT MEDIA DEFINITION

This application claims the priority benefit of the European Patent Application No. 04077038.0 filed on Jul. 14, 2004, which is hereby incorporated by reference.

BACKGROUND OF THE INVENTION

1. Field of the Invention

The invention generally relates to network printing and in particular to a method of printing documents on a network printer. The invention also relates to a computer program product for implementing the method and a system for printing documents, comprising a source station of a user, a printer and a network connecting the source station and the printer, wherein the method is implemented.

2. Discussion of the Related Art

A method and system for printing documents are generally known. For instance, the Heidelberg Digimaster® 9110 manufactured by Heidelberg Digital LLC comes with a printer driver having a paper catalog from which a user may choose the print media he or she wants to print a print job on. The paper catalog in this system can be programmed and exported to other users so that they may import it into their workstations, such that every user has the same choice of media.

There are also systems, such as the one disclosed in applicant's European patent application No. 04075139, in which a printer driver allows the user to select specific media properties, such as the size (e.g. A4) and the type (e.g. tabulated paper) and specify the selected media properties for the print job. Not-specified properties may be automatically set to system default settings.

A drawback of the known systems, however, is that a user cannot divert from the possible choices for media as preprogrammed. If the user wants to use a special, e.g. self-provided, kind of media for a particular job, he cannot program that media in his printer driver. In that case, he must bring that media to the printer (or, when the printer is located in a central repro office, to that office) and ask the operator to use it for his particular job. Or, he may include his special media in the media catalog of his printer driver, so that he may specify it for the job. Then, he must further have the media catalog of the printer adapted to also include the special media. After the job has been printed, the special media must again be removed from the catalog, since it was intended for a particular job and will not remain available at the printer. Such processes require more effort than a user normally is prepared to, and, moreover, disturb the operation of the repro office.

U.S. Patent Application Publication No. US 2003/0117639 discloses a print system in which a new, locally unknown media may be added to the set of selectable media even during the set-up of a print job. However, there the media is retained in the set after finishing the job.

SUMMARY OF THE INVENTION

It is therefore an object of the invention to provide an easy method of specifying print jobs, that gives the users the freedom of using any kind of print media, be it one of the normal media generally available for the printer or any self-provided media for one-time use.

It is another object of the invention to provide a printing method and system that overcome the limitations and disadvantages associated with the related art.

According to an aspect of the invention, a method includes a defining step including an alternative, specific, print media specifying process, in which a job-proprietary print media not included in the general set is specified for that print job by entering, through an operating unit of the source station, a free-form definition character string, as an identifying property of the job-proprietary media.

In this way, a user may specify his special print media, using the specific media specifying process, thereby bypassing the general media specifying process. When the job is finally printed in the printer, the printer controller will automatically ask the printer operator to load the required media in one of the paper trays. The special media will then be available for the job, but after the print processing it disappears from the registry of the printer and the system, since it was not necessary to enter it in the media catalog. Consequently, the catalog will not be "polluted" with media that do not exist any more, and a smooth operation of the normal media specifying process is ensured. Moreover, using a free-form character string as identifying property of the media gives an easy way to recognize the media specification as a special one.

In an embodiment of the invention, the free-form definition character string includes a message for displaying on a display of the printer.

This enables the user to use a text as the media specification, such as "Special paper, will be delivered by John", so that it will later be easy to know which special media was intended, especially at the printing stage. This is advantageous, especially in environments in which many print jobs are processed for many users, such as a central reprographic department of a company or organization.

The job-proprietary media may be additionally specified in terms of physical media properties such as size and type, since this information is necessary for the printer device. Alternatively, default values may be used.

According to an aspect of the invention, when the printer is about to start the actual processing of the print job, it checks if the print media specified in the print process parameters is at that moment available in the media trays of the printer. If it is not, the machine stops and asks the operator through a display message to load the media in one of the trays. In the message, the printer mentions at least part of the relevant media properties, for instance by reproducing the media definition string. For the example given above, the message could read: "please, load 'Special paper, will be delivered by John'". It will then immediately be clear to the operator what he has to do.

Also, according to an aspect of the invention, the printer may check at the moment the print job is prepared for printing an put into the queue, if the required media is available in the machine, and, if not, warn the operator in advance.

According to another aspect of the present invention, there is provided a method of printing documents on a network printer, comprising: defining a print job at a source station of a user for submission to and eventual printing in the printer, the print job including print data and print process parameters, the print process parameters including a specification of a print media for printing thereon images according to the print data, each media having print media properties, the definite step including, a generic print media specifying process, in which a print media for printing thereon images according tot eh print data is selected by the user within constraints of a general set of media available for any user of the printer, and an alternative, specific, print media specifying process, in which a job-proprietary print media not included in the general set is specified for the print job by entering, through an operating unit of the source station, a free-form definition character string, as an identifying property of said job-proprietary media.

According to another aspect of the invention, there is provided a computer program product embodied on at least one computer-readable medium, for printing documents on a network printer, the computer program product comprising computer-executable instructions for: defining a print job at a source station of a user for submission to an eventual printing in the printer, the print job including print data and print process parameters, the print process parameters including a specification of a print media for printing thereon images according to the print data, each media having print media properties, the defining including, a generic print media specifying process, in which a print media for printing thereon images according to the print data is selected by the user within constraints of a general set of media available for any user of the printer, and an alternative, specific, print media specifying process, in which a job-proprietary print media not included in the general set is specified for that print job by entering, through an operating unit of the source station, a free-form definition character string, as an identifying property of said job-proprietary media.

According to another aspect of the present invention, there is provided a system for printing documents, comprising: a source station, a printer, and a network connecting the source station and the printer, wherein the source station includes a print service for defining a print job at the source station and for submission of the defined print job to the printer for printing, the print job including print data and print process parameters, the print process parameters including a specification of a print media for printing thereon images according to the print data, each media having print media properties, the print service including a print job defining module including a generic print media specifying module for enabling the user to select a print media for printing thereon images according to the print data within constraints of a general set of media available for any user of the printer, the print job defining module also including an alternative, specific, print media specifying module for enabling the user to specify for that print job a job-proprietary print media not included in the general set by entering, through an operating unit of the source station, a free-form definition character string, as an identifying property of said job-proprietary media.

BRIEF DESCRIPTION OF THE DRAWINGS

These and other aspects of the invention will be apparent from and elucidated further with reference to the embodiments described by way of example in the following description and with reference to the accompanying drawings. The description and the drawings are given by way of illustration only, and thus are not limitative of the present invention.

In the drawings,

FIG. 1 shows a network system of workstations and printers;

FIG. 2 shows a schematic functional view of a system according to the present invention;

DETAILED DESCRIPTION OF THE PREFERRED EMBODIMENTS

Figure 3:
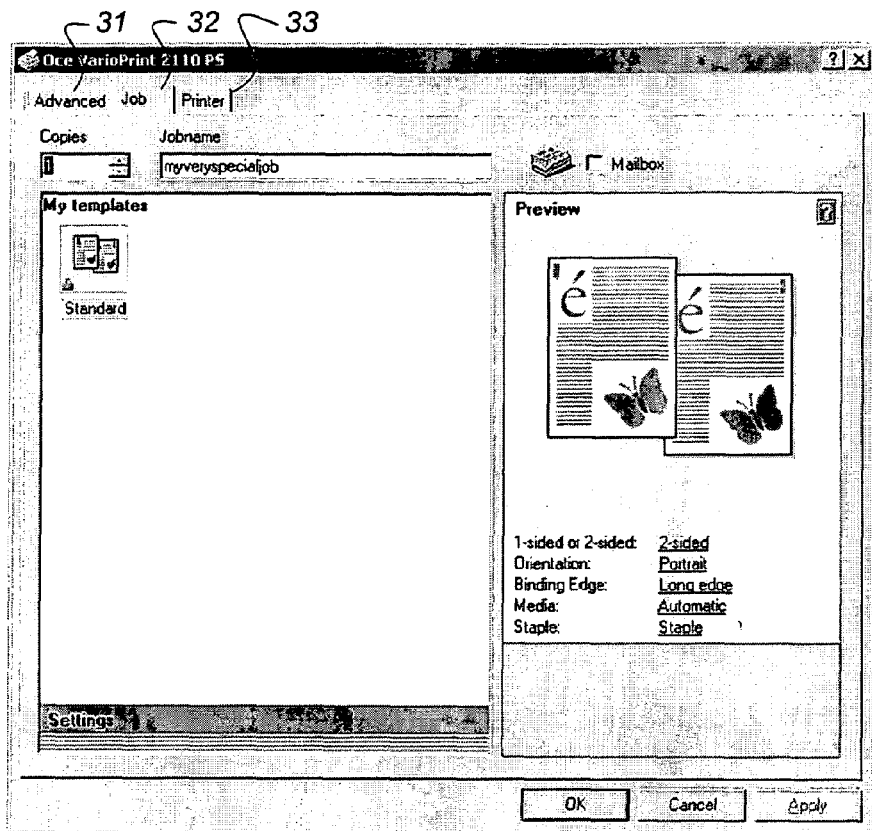
FIG. 3 shows a job specification window of a printer driver according to the invention.

FIG. 1 shows a system of source stations (1) and at least one printer (2) connected by a network (N) e.g., a local network. Source stations may, for example, be user workstations or PC's and are in each case equipped with a processor unit, a monitor, a keyboard and a mouse or other indicator instrument. Also, a source station may be a server, possibly a PC, running a print room application program, when the printer is located in a central repro department. In the latter case, the server is used to coordinate the processing of jobs on the printer. In the following, the term "workstation" is used for any kind of source station.

The term "printer" includes a digital copying machine in this context, and the jobs processed on it may in that case include copy and print jobs alike. The printer 2 includes several input trays 2-1, 2-2, 2-3 and 2-4 for print media, mostly paper sheets, a finishing station having several output trays 4 and a local graphical user interface (GUI) 5 having operating means such as buttons and a display.

Users who wish to have a specific data file printed from their workstation can choose from a plurality of printers or even from all the printers in the system.

In order to be able to send a print file to a printer, a workstation must include a program called "printer driver". A printer driver program is logically coupled via the network N to one of the printers. When the user has access to a plurality of printers, his workstation contains a printer driver for each one of the printers.

FIG. 2 shows a schematic functional view of a system of a user workstation 1 and a printer 2 according to an embodiment of the present invention. The workstation 1 includes an application program 9 for producing files for printing, such as a document editor, and a printer driver program 10 These programs may be installed on the internal hard drive of the work station 1 or may be embodied on one or more computer-readable media accessible by the workstation 1, and can be written with any existing computer language.

When a user wants to have a print job printed, he calls up the printer driver, for example by clicking an icon intended therefor in the application window on his display screen of the workstation 1. Alternatively, the printer driver may be called up via the print service of the operating system. For instance, in MS Windows the print service is activated via the File menu and a job specification window may be opened by clicking the "Properties" window.

As shown schematically in FIG. 2, the printer driver program 10 includes a data processing portion 11 for reformatting the image data from the application program 9 into print data usable for the printer 2 (generally in page description language such as Postscript) and for handling system management information, and a user interface portion 12 such as a GUI for communicating with the user.

Upon activation, the printer driver user interface portion 12 opens a job specification window on the workstation display screen, into which the user can input specifications for process parameters of the intended print job (generally called "settings"), such as the number of copies, single or double sided printing, and so on. The user may select values for the settings or accept the preselected default settings. Some of the settings may already be selected by or with the application.

Finally, the user must activate (e.g., click) a print button in the driver window. In reaction, the printer driver renders the print data and sends them, together with the settings, to the printer 2 via the network N.

Additionally, the printer 2 sends, via the network N, status information back to the printer driver 10, that presents such information to the user via the user interface 12.

FIG. 3 shows an example of a job specification window 30 of a printer driver according to the invention. The window includes three tab sheets 31, 32, 33 placed on top of each other and selectable by clicking on the relevant tab. The tab sheet shown in FIG. 3 is the "Job" tab 32. This "Job" tab sheet 32 is dedicated to the definition of a new print job. The other tab sheets include "Printer" for system and status information of the printer device, and "Advanced" for specifying detailed settings such as font selection and pdl interpreter control, normally not used in job specification.

Figure 4:
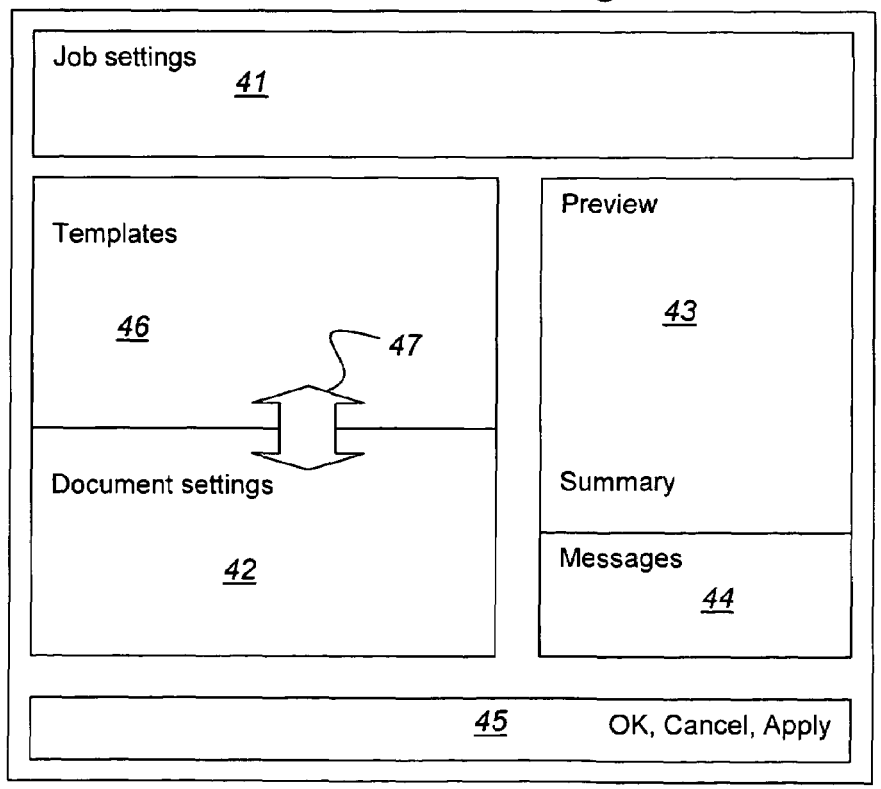
FIG. 4 shows a schematic setup of the job specification window of FIG. 3.

The "Job" tab sheet 32 is more schematically shown in FIG. 4, and comprises the following fields:

Job settings (41): Here the user can define settings that affect the workflow of the job, and do not affect the printed document. The settings are <number of copies>, <job name> and <mailbox>. If "mailbox" is checked, print jobs are not immediately printed upon reception at the printer, but wait there for selection and subsequent starting by an operator at the printer console.

Document settings (42): In this field, settings can be specified that affect the printed document. For the comfort of the users, the settings are arranged in a number of collapsible groups to make them easily surveyable. In an exemplary embodiment, the following groups are defined and shown in FIG. 5:

Layout

The settings in this group describe how the pages of the document should look like, such as the orientation of the pages, whether the document is 1-sided or 2-sided, the position of the binding edge and the margin shift.

Paper

The settings in this group describe on which paper the document should be printed. Here the user can choose the print media for the document, generally by selecting one of: a printer default, a catalog selection from a pre-stored and updated catalog of available print media or a custom option of specifying a self-defined media identifier, as will be explained in more detail hereinafter. Further, this group includes settings for possible front and back covers. From here a Page Programming tool can be activated by clicking a button (not shown), for defining sets of different media types within a document.

Finishing

The settings in this group describe how the document should be bound and delivered at the printer. It includes stapling, collation, output bin selection, etc.

Image

The settings in this group describe how the content of the pages should look like on the print. It includes raster fineness, watermark addition, etc.

Figure 5:
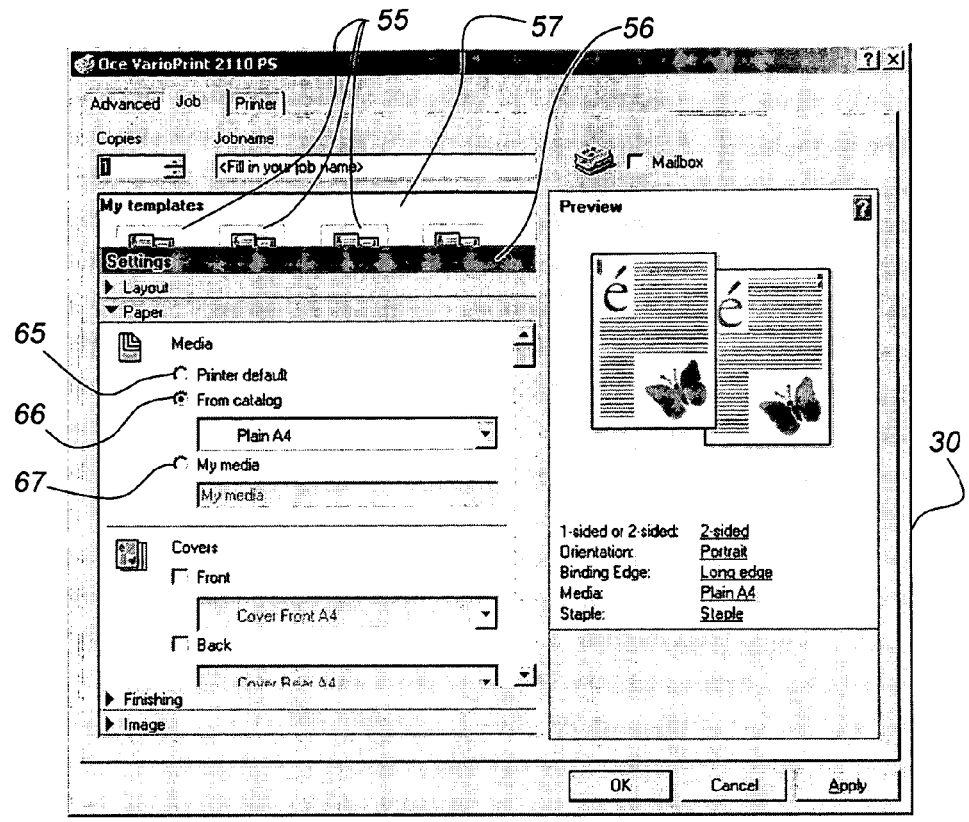
FIGS. 5, 6, 7 and 8 show other views of the job specification window.

In FIG. 3, the settings groups are all in the collapsed state. By clicking the arrow triangle in the Settings bar, one of the groups is exploded. This is shown in FIG. 5 for the Paper group. The described embodiment of groupings and settings is to be considered an example, and many other examples will be apparent to a skilled person.

Continuing the fields of the "Job" tab sheet 32:

Preview and Summary (43): As discussed above, the amount of settings can be very large. Most users will only use a small part of all these settings, and most settings will only be changed occasionally.

To accommodate for this the driver will show a summary, containing the most commonly used settings (and their value) for that printer, which provide a direct access to these settings.

The structure of the summary items is:
<Setting name> [Setting value]

Clicking the [Setting value] will open the relevant group in the settings field 42.

The preview shows graphically the settings (as far as possible) made or accepted by the user.

Message area (44): Below the summary an area is reserved for relevant messages from the system to the user. These are error, contradiction or supplies related messages.

An area (45) at the bottom of the driver window (in fact, outside the "Job" tab sheet) is reserved for Windows' OK, Cancel and Apply buttons.

Templates (46): A template is defined as a coherent set of setting-defaults describing a print job. A template is based on capabilities of a specific printer or printer type. It allows the user to define a print job in a quick and efficient way by simply clicking a corresponding icon in the Templates field 46.

A template is automatically created every time the user selects an already existing template, changes one or more of its settings, and confirms the change(s) by clicking any of the "Apply" or "OK" buttons in the area 45. A new template, containing these new setting(s), is automatically added to the list, and is given a unique name. e.g. Template {n} (n is an integer number, each time higher than the highest existing one).

Once created, the template does not change. It can not be edited, except for its name. The name may be changed by using a contextual menu ("double click") option 'Rename'.

A template can be deleted by the user by right-clicking on it and selecting "Delete" in the pop-up menu that appears then.

A template can be created on 2 locations: in the driver launched from the printing preferences (via Windows Start menu), and in the printer driver launched from an application (e.g. MS Word).

A template is represented in the Templates field 46 by an icon and a name. The icon is dynamic and is a smaller representation of the Preview. A limited number of the settings represented by the template can be recognized in the icon. When a template is selected, the preview of the result is displayed in the Preview section. A template displays a tool tip with its full name and its creation date/time.

As shown in FIG. 4, the Templates field 46 and the Settings field 42 share one space in the printer driver window, as represented by an arrow 47. For handling templates, the settings field is collapsed, and this is also the normal view when the driver window is opened. The settings field is opened automatically on a double-click on a template icon or on a click on an arrow symbol in the upper bar of the collapsed settings field. One of the document settings groups may be opened at a time by clicking the upper bar of each group, as shown in FIG. 5, wherein the group "Paper" shown is opened.

When the settings field is opened, a small strip of the templates (55) is still visible, to avoid that the user cannot retrieve the templates, as can be seen in FIG. 5. The settings can be closed by either clicking on the Settings bar 56 or clicking on the small part (57) of the templates area that is still visible.

Figure 10:
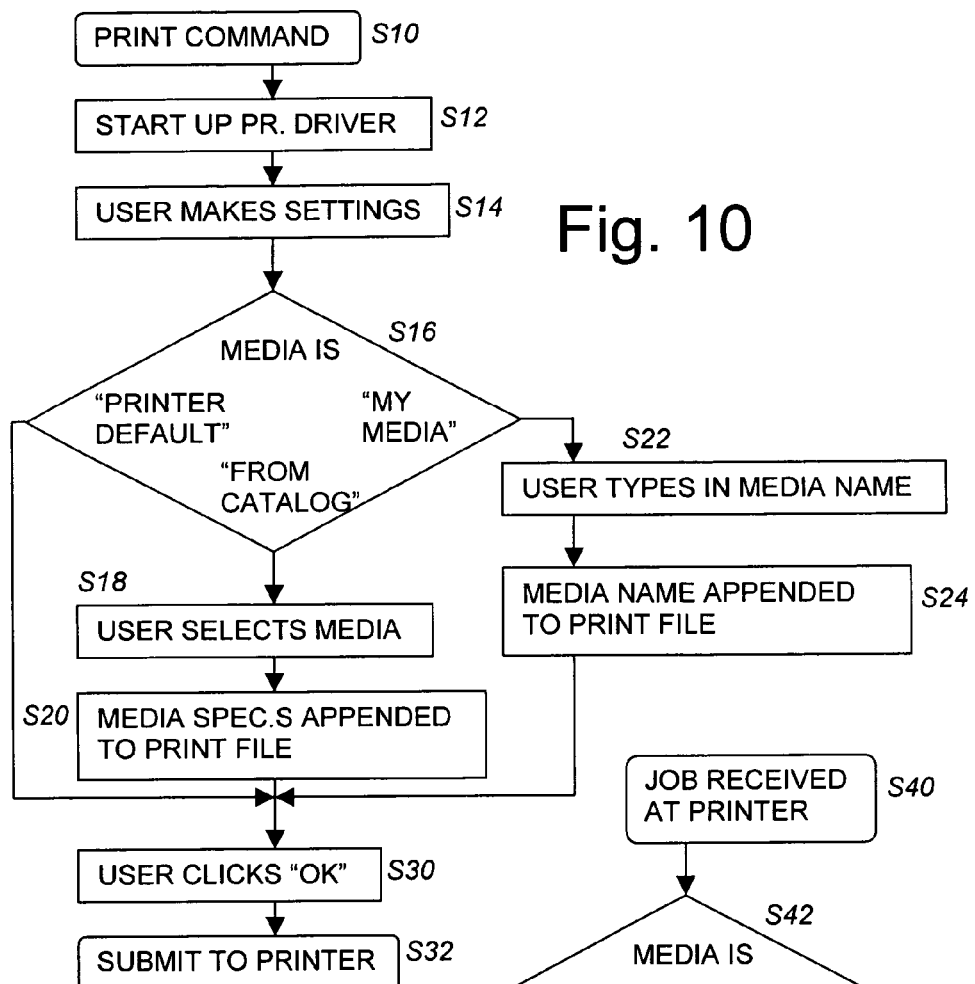
FIG. 10 is a flow chart of a print job definition process according to the present invention.

The print submission process according to the present invention will now be described with reference to FIG. 10. The processes of FIGS. 10 and 11 can be implemented using the system of FIGS. 1-4, or other suitable system/device.

Basically, the print submission process starts with the user giving a print command (S10) by selecting the Print option in an application program or in another (well-known way). In reaction, the printer driver is automatically started up and shown on the display screen of the workstation (S12). Next, the user may make settings for the print order (S14), by selecting a template and possibly changing one or more of the settings therein. The process of making settings includes selecting a media type, which will be explained in detail hereinbelow. The settings process ends with the user clicking the "OK" button in the lower right corner of the driver window to confirm the settings (which action automatically creates a new template, as explained above). Finally, the user may return to the Windows print service by clicking the "OK" button (S30), also in the lower right corner of the driver window and activate the print command by again clicking an "OK" button. In reaction, the driver prepares the print file and submits it to the printer (S32).

The process for making media settings for a print job will now be described in detail, still with reference to FIG. 10.

As described before, in the settings field "Paper" the user is enabled to select the media on which the print job will be printed. As shown in FIG. 5, three different choices for media are offered, in the present example in the form of three radio buttons, for "Printer default" (65), "From catalog" (66), and "My media" (67), for the user to select (S18). In the option "Printer default" (65), the default media as set in the printer, that conforms to the size selection of the application program is automatically selected. Normally, this kind of media is the one loaded in the bulk tray of the printer.

In the option "From catalog" (66), the user is given the opportunity to choose a media type from a catalog that is stored in the memory of his workstation. It is contemplated by the present inventors to have a management program in the workstations automatically synchronize the local catalog with a master catalog in the print server of the reprographic department where the printer is located every time the printer driver is started up, or at regular intervals, such as every day or every hour, to ensure that the catalog in every workstation is always up-to-date. Alternatively, the master catalog may be accommodated in the printer connected to the printer driver. The master catalog is preferably maintained by the repro department personnel or the key operator of the printer.

The catalog includes all available choices of print media, including media that are not presently loaded in the media trays of the printer but are in stock at the printer site. It will be readily understood that the media defined by the "Printer default" option mentioned before is one of the media in the catalog.

Figure 6:
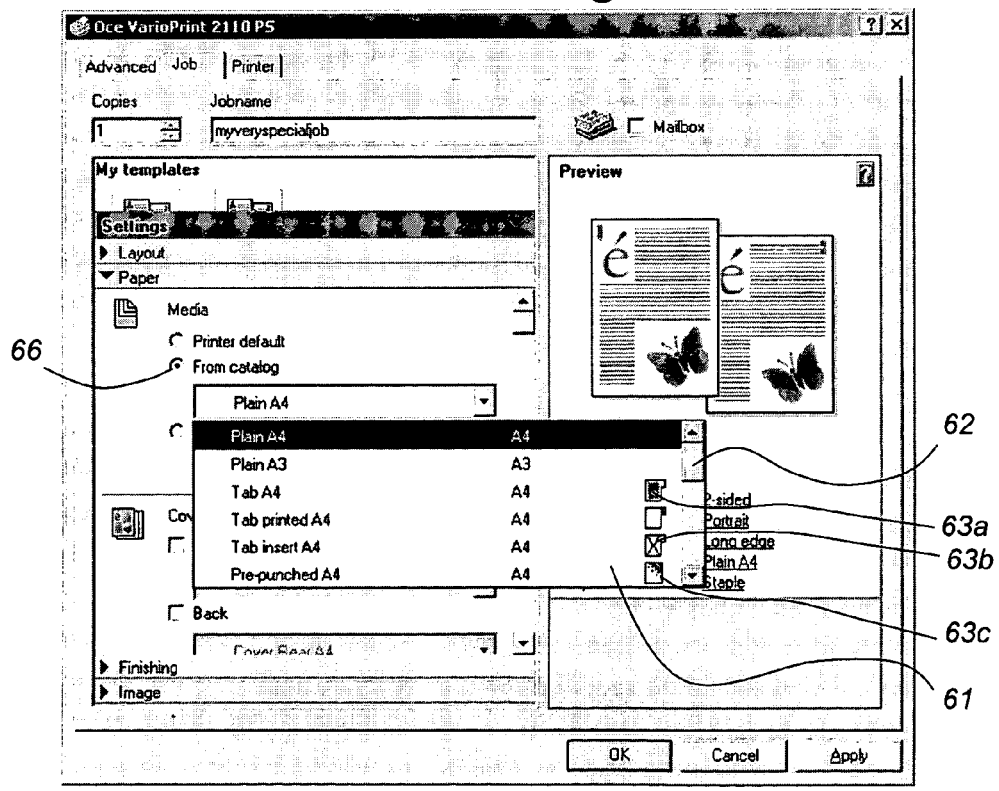

FIG. 6 shows the screen image of the printer driver after a user has clicked the "From catalog" option 66. A drop-down menu 61 is then shown, including the complete media catalog. Each media entry in the menu includes, from left to right, a media name, a size and an icon visualizing the most important properties. For example, the uppermost icon 63a in the menu shown in FIG. 6 indicates a tab sheet (tab shown in icon), that is for printing on (text shown in icon). Other icons indicate insert sheets (cross drawn in icon 63b), and oriented media (icon 63c with shaded edge). Normal media do not have an icon. If the list in the catalog is too long to be shown completely, a scrollbar 62 appears, to facilitate viewing the entire catalog. The user may now make his selection of media by clicking on an item in the catalog (S18). The printer driver then adds the media specification selected by the user to the print file (S20).

It may happen that a user wants to use a kind of media that is not included in the catalog, e.g. because it is not available in the repro department. In such cases, the user may decide to bring the intended media to the printer or repro department, respectively, himself. Or, he may want to indicate to the printer operator, where he can get the intended material. For such cases, and possibly for other purposes, a third option "My media" (67) is included in the option list in the "Paper" group of settings. This option is especially dedicated to a media type that is used for a single job, in other words, a job-specific media. It can be defined in the printer driver as will be explained below, but it can only exist in relation to that job. It is expressly not included in the media catalog and it is not available for other users, who are not even aware of its existence.

Figure 7:
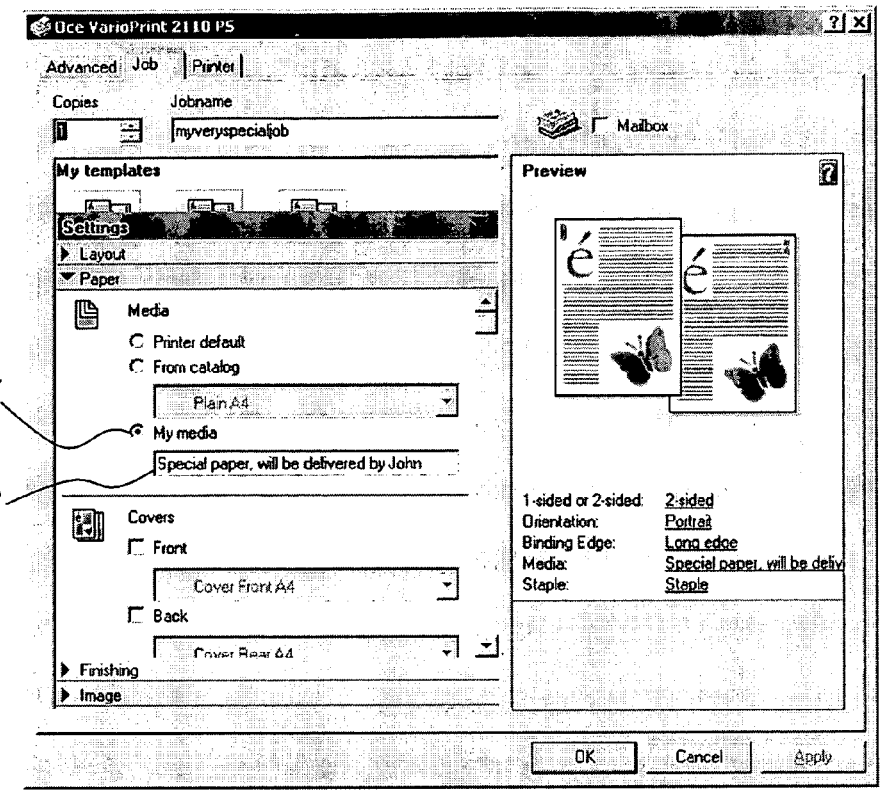

As shown in FIG. 7, when the "My media" radio button 67 is clicked, the input field 68, that is normally grayed, is opened for the user to enter a text string. The user may now type in a media name (S22). The media name will later be shown as a message at the local user interface of the printer at the moment the print job is about to start, as will be described hereinafter. In the example of FIG. 7, the user has typed in: "Special paper, will be delivered by John", with the intention to warn the operator of the printer to look for paper that has been brought to the repro department. Of course, especially in the case of a standalone printer, the "operator" may be the user himself, having walked up to the printer to print his job.

The message in the input field 68 is included in the print file by the printer driver as a media-related attribute (S24). In a first embodiment, no further information as to the nature of the intended media can be entered by the user. In this simple embodiment, the size and the type of the media are automatically specified by the document editor application of the user and the print system (printer driver or printer controller), respectively. The media name and size and type information is added to the print file as a media-related attribute and will be used in the media management of the printer controller, as will be explained later with reference to FIG. 11.

In a second embodiment, a further characterization of the job-specific media is required by the printer driver program. Upon activation of the "My media" option (by the user clicking the radio button), input fields for entering media size and media type (e.g. "plain", "tab", "insert", "oriented" and combinations thereof, preferably through the use of drop-down menus, are opened in addition to the input field for the media name. The additional information is also added to the print file as a media-related attribute.

Figure 8:
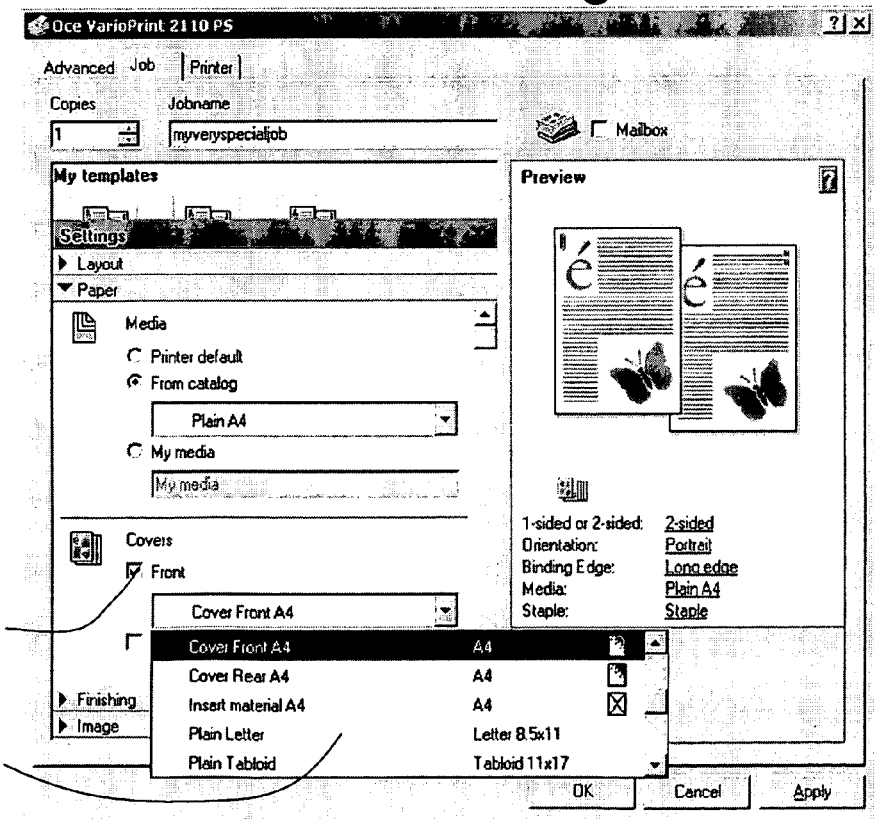

The media catalog may also be used in the "Covers" option, for selecting a media type for covers material. As shown in FIG. 8, when the user has clicked a cover check box, such as the "Front" cover one 72, the media selection input field is opened and the user may make a choice from a drop-down menu 73 including the entire catalog, now focused on a cover material pre-selection pre-programmed by the repro department personnel or the key operator of the printer.

Not shown in FIGS. 5-8, but situated in the "Paper settings" area below the "Covers" section, is a button for starting up a page programmer program. This page programmer program is operative to program media options for all of the pages of the current print job. The media catalog as well as the proprietary media defined in the "My media" section are available for selection in the page programmer.

Figure 11:
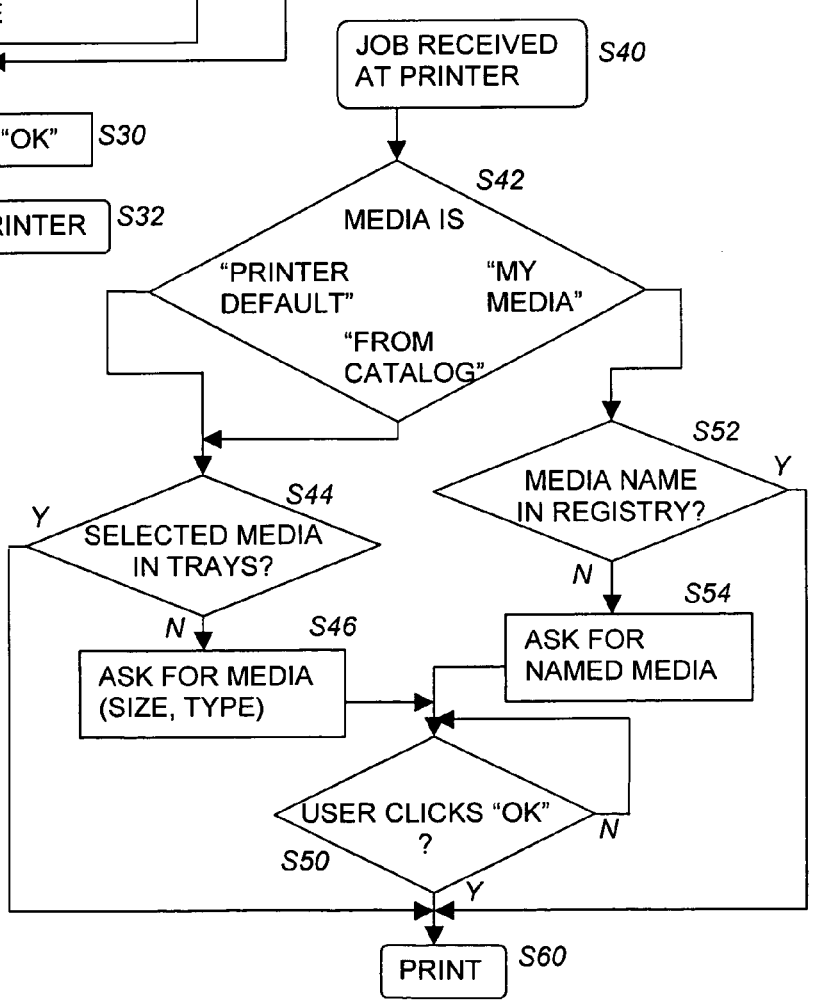
FIG. 11 is a flow chart of a print job handling process in a printer according to the invention.

It will now be described how a print job is processed in the printer 2. Reference is made to FIG. 11.

The process starts with the printer receiving a print job from one of the user workstations (S40). In the printer controller, the print settings of the print job, among which are the print media settings, are analyzed (S42). Generally, if it turns out that the print settings cannot be met in the present situation, a warning is shown to the operator by displaying a message on the display screen (e.g., 80 in FIG. 9), asking to take appropriate action. This particular process will now further be explained for the print media setting.

If the media setting is "Printer default" or "From catalog" at step S42, it is checked if the specified media is at that moment available in any of the media trays (S44), and if so, the job is immediately printed (S60) (assuming that a sufficient amount of that media is still present in the trays; an "out of media" recovery is not part of the invention and will not be described here).

If it turns out that the specified media is not at that moment available in any of the media trays, the operator is asked, via a display message, to load media having the required specifications in one of the trays (S46). When the operator reports to have done so (S50), the job is immediately printed (S60).

If the media setting is of the "My media" kind at step S42, the internal registry of printer is checked if a media carrying the media name defined by the user during the job definition process in the workstation is at that moment available in any of the media trays (S52), and if so, the job is immediately printed (S60). If it turns out that the specified media is not at that moment available in any of the media trays, the operator is asked, via a display message, to load media having the specified media name in one of the trays (S54). When the operator reports to have done so (S50), the job is immediately printed (S60).

Figure 9:
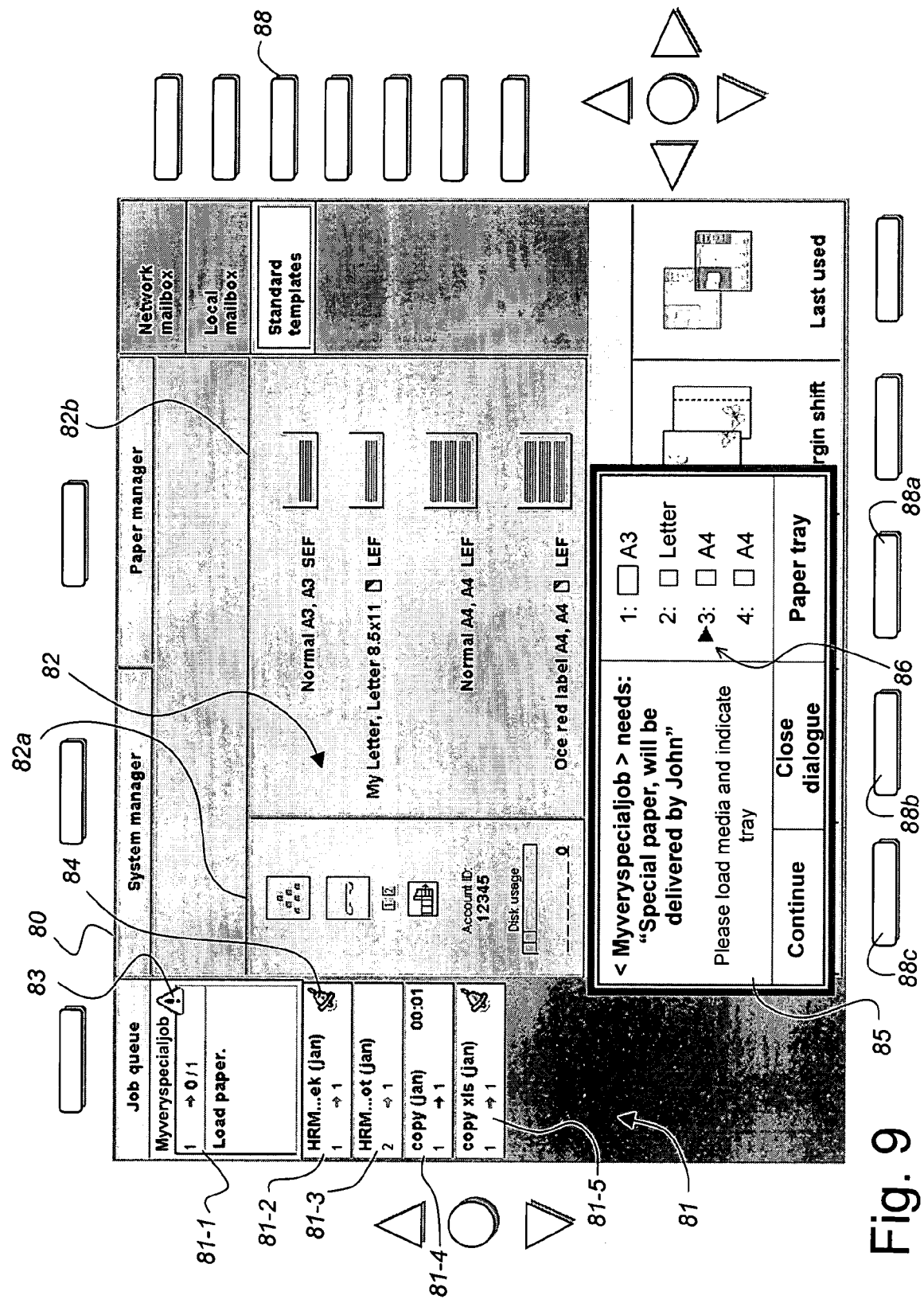
FIG. 9 shows a user interface display window of a printer, incorporating aspects of the present invention.

FIG. 9 shows the relevant part of the local user interface 5 of the printer 2 according to the present invention. The display screen 80 of the printer 2 displays at its left side a view 81 on the job queue, i.e. the series of jobs (81-1 to 81-5) that have been defined, both copy jobs and print jobs, and that are waiting for their turn to be printed. When a job cannot be printed for any reason, this is indicated by a warning icon 83 or 84 as shown in FIG. 9. For instance, the uppermost job 81-1 cannot be printed, since the print media it needs is not presently available in the print media trays (2-1 to 2-4 in FIG. 1). It is marked with a triangle carrying an exclamation sign (83), indicating that immediate action is required.

Other jobs in the queue, 81-2 and 81-4, also have a problem, but since they are not yet at the top of the queue, their problems are less pressing, and therefore they are shown with a bell sign (84) to show that action is required, though not immediately.

In the center of the display screen is the system monitor area 82, having at the left a warning area 82a for possible malfunctions or low supplies, and at the right a media area 82b showing the contents and the fill situation of the print media trays (2-1 to 2-4 in FIG. 1).

Around the display screen there are situated push buttons 88 for an operator to select functions and values displayed on the screen.

Also shown in FIG. 9 is a forced dialogue window 85, that has appeared since the job 81-1 at the top of the queue needs print media that are at that moment not present in the media trays of the printer. In fact, this job was programmed to use media defined according to the "My media" option in the printer driver of FIG. 7, and the printer has no media in its trays carrying the name programmed.

In the forced dialogue window 85, the operator is asked to load the required media into one of the trays and then indicate in which tray he has loaded it. The operator should now go and fetch the required paper (assuming that John has indeed delivered it), choose one of the media trays and load it into that tray. The window 85 is shown situated right over three of the push buttons at the lower side of the display screen 80, and those buttons 88a, 88b, 88c have now automatically acquired the options shown at the bottom of the window 85, namely, "Paper tray" 88a (a cyclic toggle switch to indicate the tray chosen—the indicated tray is identified by an arrow sign 86), "Continue" 88c (to tell the printer that the media has indeed been loaded), and "Close dialogue" 88b (to give an operator an opportunity to solve the problem in another way).

When the operator indicates one of the trays and then actuates the "Continue" key 88c, the printer assumes automatically, that the media type it has asked for is indeed loaded and automatically re-programs the contents of the indicated tray in its registry. This is advantageous, since the operator does not have to re-program the tray content himself. Then, the printer automatically starts processing the job.

It may be possible that a user has submitted several print jobs that should all be printed on the same "My media". When the printer comes to the next job requiring that media, it checks its registry, and if it finds that the required media is still in the tray in which it had been loaded for the former job, it automatically processes that print job, using that media. If, however, the relevant tray has in the meantime been used (and re-programmed) for other media, the printer finds that the required "My media" is not present and again asks for loading it.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Although the present invention has been described on the base of the embodiments above, the skilled person will recognize other embodiments within the scope of the claims. Such embodiments are considered to be covered by the protection of the patent.

What is claimed is:

1. A method of printing documents on a network printer, comprising:

defining a print job at a source station of a user for submission to and eventual printing in the printer, said print job including print data and print process parameters, the print process parameters including a specification of a print media for printing thereon images according to the print data, each media having print media properties including physical media properties for controlling the printing process in the printer, and the printer having trays for media and a registry for registering media lodged in the trays, the defining step including:

a generic print media specifying process, in which a print media for printing thereon images according to the print data is selected by the user within constraints of a general set of media available for any user of the printer, and an alternative, specific, print media specifying process, in which a job-proprietary print media not included in the general set is specified for respective print job by entering, through an operating unit of the source station, a free-form definition character string, as an identifying property of said job-proprietary media, wherein said job-proprietary media is not entered into said general set of media available for any user of the printer, wherein the job-proprietary print media is registered in the registry upon loading the job-proprietary print media in a tray in connection with printing the respective print job, until reprogramming the registry for said tray.

2. The method of claim 1, wherein said free-form definition character string includes a message for displaying on a display of the printer.

3. The method of claim 1, wherein the generic print media specifying process includes selecting print media properties, either singly or in combination, from a list.

4. The method of claim 3, wherein said list is pre-stored in a printer driver of the source station, and is automatically synchronized with a master list in the printer or in a central print server.

5. The method of claim 1, further comprising:
determining, at the printer, for a print job having print process parameters specifying said job-proprietary print media, if a media having said identifying property is available in the printer, and, if not, requesting an operator in a message shown on a display of the printer, to fill a media tray with the specified media, said message including at least part of the free-form definition character string.

6. The method of claim 5, wherein the step of requesting an operator to fill a media tray with the specified media is done at the moment the specified media is about to be used by the printer.

7. The method of claim 5, wherein upon a confirmation of the operator that the requested media has been put into a tray, the printer enters the specification of the requested print media into its print media registry for that tray.

8. The method of claim 1, further comprising:
checking, when the print job is queued, if the print media specified in the print process parameters of the print job is available in the printer, and, if not, warning an operator.

9. The method of claim 1, wherein the source station is either a user workstation or a server running a central repro service application program.

10. A system for printing documents, comprising:
a source station, a printer, and a network connecting the source station and the printer,
wherein the source station includes a print service for defining a print job at the source station and for submission of the defined print job to the printer for printing, said print job including print data and print process parameters, the print process parameters including a specification of a print media for printing thereon images according to the print data, each media having print media properties including physical media properties for controlling the printing process in the printer, and the printer having trays for media and a registry for registering media lodged in the trays, the print service including a print job defining module including a generic print media specifying module for enabling the user to select a print media for printing thereon images according to the print data within constraints of a general set of media available for any user of the printer, the print job defining module also including an alternative, specific, print media specifying module for enabling the user to specify for a respective print job a job-proprietary print media not included in the general set by entering, through an operating unit of the source station, a free-form definition character string, as an identifying property of said job-proprietary media, wherein said job-proprietary media is not entered into said general set of media available for any user of the printer, wherein the job-proprietary print media is registered in the registry upon loading the job-proprietary print media in a tray in connection with printing the respective print job, until reprogramming the registry for said tray.

11. The system of claim 10, wherein said free-form definition character string includes a message for displaying on a display of the printer.

12. The system of claim 10, wherein the print job defining module includes a list module for enabling a user to select, in the course of said specific print media specifying process, media properties, either singly or in combination, from a list.

13. The system of claim 12, wherein said list is pre-stored in the list module, and the list module is adapted to automatically synchronize the list with a master list in the printer or in a central print server.

14. The system of claim 10, wherein the printer is provided with a printer controller for determining, for a print job having print process parameters specifying a said job-proprietary print media, if a media having said identifying property is available in the printer, and, if not, requesting an operator in a message shown on a display of the printer, to fill a media tray with the specified media, said message including at least part of the free-form definition character string.

15. The system of claim 14, wherein the controller requests the operator to fill a media tray with the specified media is done at the moment the specified media is about to be used by the printer.

16. The system of claim 14, wherein the printer controller maintains a print media registry, and is adapted to, upon a confirmation of the operator, that the requested media has been put into a tray, enter the specification of the requested print media into its print media registry for that tray.

17. The system of claim 10, wherein the printer is provided with a printer controller that checks, when the print job is queued, if the print media specified in the print process parameters of the print job is available in the printer, and, if not, warns an operator.

18. The system of claim 10, wherein the source station is either a user workstation or a server running a central repro service application program.

* * * * *